Inventor
Herbert G. Kamrath

June 4, 1940.   H. G. KAMRATH   2,203,495
NODULATED OIL FILTER
Original Filed May 29, 1936   2 Sheets-Sheet 2

Inventor
Herbert G. Kamrath
By Blackmore, Spencer & Flint
Attorneys

Patented June 4, 1940

2,203,495

UNITED STATES PATENT OFFICE 2,203,495

NODULATED OIL FILTER

Herbert G. Kamrath, Flint, Mich., assignor to General Motors Corporation, Detroit, Mich., a corporation of Delaware Application May 29, 1936, Serial No. 82,445
Renewed June 8, 1938

9 Claims. (Cl. 210—131)

This invention relates to oil filters, particularly a filter used in the oiling system of internal combustion engines used on automotive vehicles.

The particular novelty of the invention relates to the use of neutral nodulated mineral wool or mineral cotton through which the oil must pass to be filtered. Under the term of mineral wool or mineral cotton are included such substances as rock wool and slag wool which comes from the manufacturer in a fibrous or stringy form and has been found to be very satisfactory for use in oil filters. In conducting experiments with mineral wool or mineral cotton to be used in oil filtration, I found that if the ordinary stringy rock wool or slag wool is worked to cause the fibrous mass to collect into small balls or nodules, I could mix these balls or nodules with a suitable binder such as a cold water paste (potato or wheat starch) and then by compacting the mixture in about a two to one ratio, and subsequently drying, I obtained a better and more satisfactory oil filter. The life and efficiency of the oil filter will depend upon the size and uniformity of the nodules and by working and reworking the fibrous or stringy mass, the nodules can be obtained in a sufficiently small size to make them dependable and very efficient for use as a filtering element in oil filters. The nodules used in making the filter are on the average about the size of a small pea and when compacted are about one-half this size. Many of the nodules are of course larger or smaller than the average.

The completed filter preferably has the compacted hard nodulated filtering substance and binder placed around a spool mounted in a suitable container having the usual inlet and outlet openings.

On the drawings, Figure 1 is a view in elevation of the filter with parts broken away and shown in section to show the filtering element in place.

Figure 1:
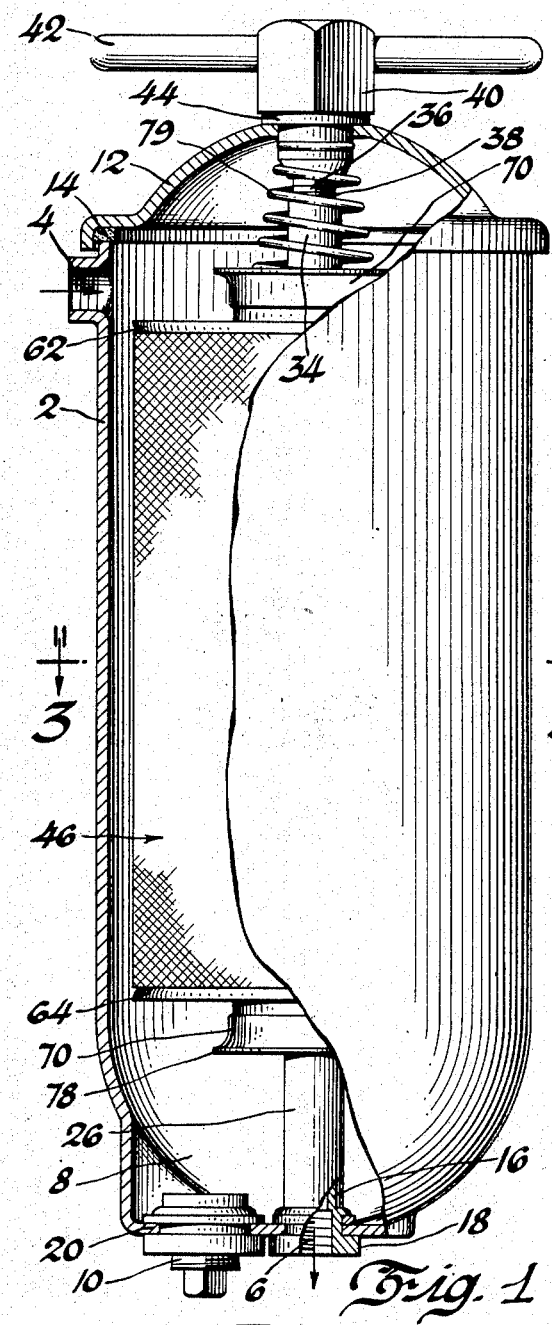
Figure 2:
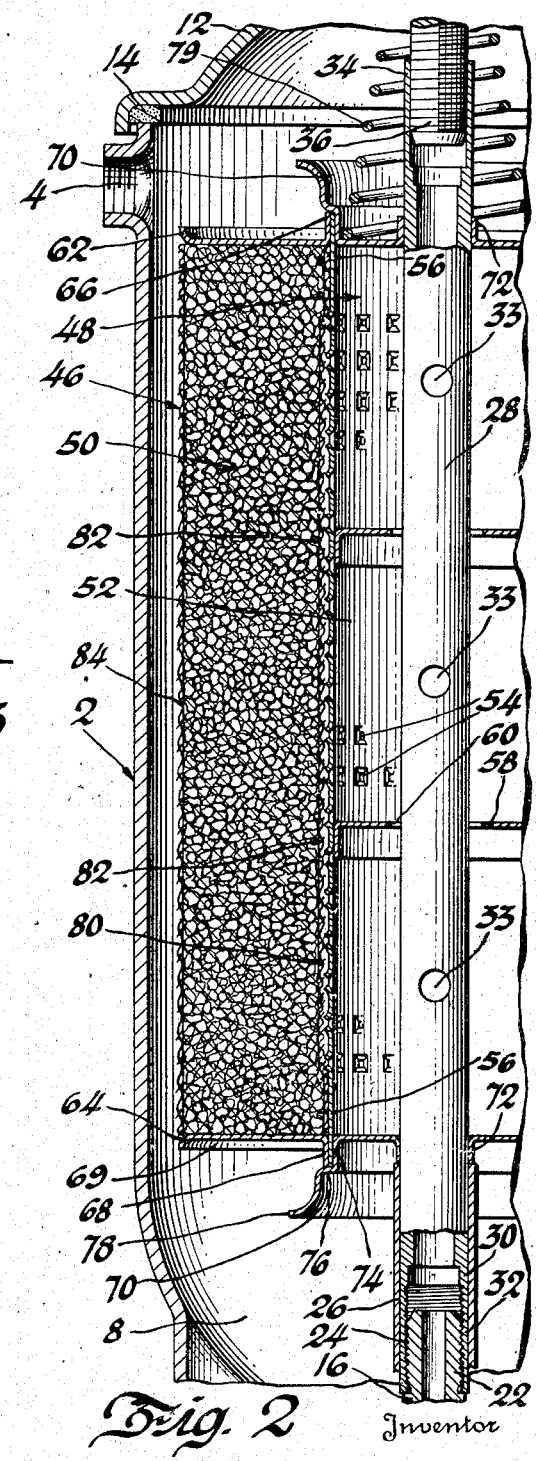
Figure 2 is an enlarged detailed sectional view through the filter.
Figure 3:
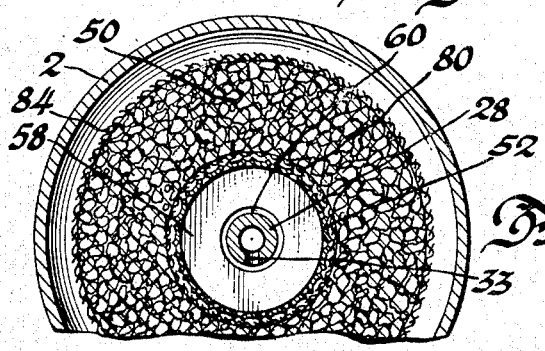
Figure 3 is a section on line 3—3 of Figure 1.

Referring to the drawings, the oil filter container 2 has the inlet opening 4 and the outlet opening 6. The container has a sump 8 at its bottom and a drain plug 10 to clean the sump when desired. The filter has the cover 12 and a gasket 14 between the cover and the open top of the filter.

The outlet opening 6 is formed in a stud 16 secured by means of its head 18 to the bottom 20 of the filter. The stud is hollow and projects up into the filter and has its end 22 screw-threaded as indicated at 24. A spacer tube 26 fits over the stud and extends into the filter beyond the end 22.

A hollow tube 28 extends through the middle of the filter and has its lower end 30 threaded as at 32 to screw onto the threaded end 22 of the stud 16. Suitable openings 33 in the tube 28 allow the exit of filtered oil. The end 30 of the tube 28 is received inside the spacer tube 26. The upper end 34 of the tube is interiorly screw-threaded and receives the threaded end 36 of a bolt 38 the head 40 of which extends outside the filter and has a handle 42 to secure the threaded end 36 into the tube 28. A gasket 44 between the bolt head 40 and the cover 12 forms a liquid tight connection. The tightening of the bolt 38 holds the cover 12 on the container 2.

The filtering unit is designated as a whole at 46 and comprises the spool element 48 and the filtering substance 50. The spool 48 comprises the central column or cylinder 52 provided throughout the greater portion of its length with a plurality of perforations indicated at 54. For a short distance at the two ends of the tube as indicated at 56, there are no perforations, the tube being left solid. On the inside of the tube in spaced relation, there are secured the flanged spacers 58 having the central openings 60 to allow the passage of the tube 28. At each end of the column 52 the disks 62 and 64 are provided. Each disk has the central annular flange 66 and 68 which snugly and closely fit around the extremities of the column 52. The outer edges 69 of the disks are outwardly turned as shown to give added strength to the spool. Inside each end of the cylinder or column 52, cup shaped members 70 are provided. At the bottom center of the cup the annular flanges 72 are provided and are adapted closely to fit over the tube 28. The flange 72 of the lower cup 70 rests on the top of the spacer tube 26 and serves to position the spool 48. The outer bottom circumference of the cup as at 74 is adapted very closely to fit inside the end of the column or cylinder 52. The cups have the shoulders 76 to limit the inward movement thereof and also are provided with the flared edge parts 78 to form a handle to aid in installing or removing the filtering unit. The cylinder 52, flanges 68 and part 74 are secured together at a plurality of points by spot welding. A truncated conical coil spring 79 between the cover 12 and the cup 70 holds the filtering unit 46 in place.

Surrounding the cylinder 52 there is preferably placed a single winding of a fabric 80 such as canton flannel or other suitable fabric, to protect the perforated cylinder 52 and to prevent the entrance therein of any particle which may free itself from the filtering material 50. The fabric 80 is held in place by means of the threads or wires 82.

The novel filtering substance comprising the compacted neutral nodules of silica wool fills the entire space around the column 52 and between the end disks 62 and 64 and there is preferably placed around the outside of the filtering substance, a fabric 84 such as cheese cloth which will have substantially no filtering function but will prevent damage to the unit during handling and installation. This fabric 84 is wrapped tightly around the filtering substance 50 and where the fabric ends overlap, they are pasted together. The nodules are preferably not large and have a diameter of substantially three-sixteenths ($\frac{3}{16}$) of an inch to one-half ($\frac{1}{2}$) of an inch. After the filtering unit is once installed, it is immaterial whether the fabric 84 is on the unit or not for the reason that the compacted filtering substance 50 is self-sustaining and needs no exterior support. It will not disintegrate by the passage of oil therethrough and in the ordinary use to which the filter is subjected, the filtering substance is self-sustaining and will retain its original shape.

Figure 4:
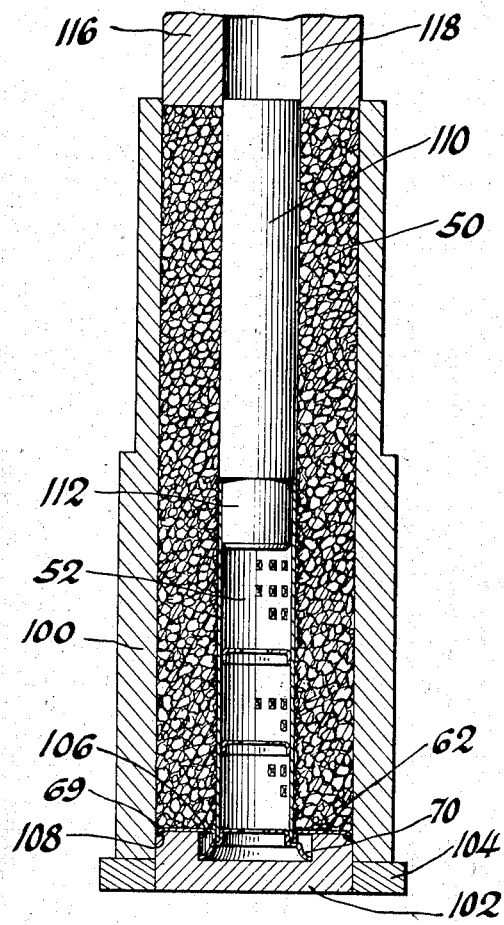
Figure 4 is a section through the mold to form the filtering unit before the filtering substance is compressed, the mold being filled with nodulated silica wool.
Figure 5:
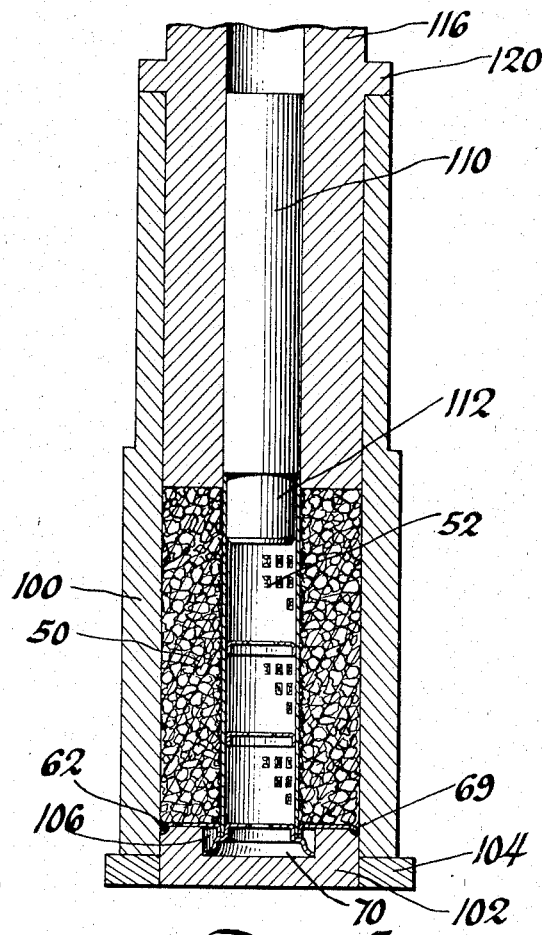
Figure 5 is a view similar to Figure 4, but showing the filtering substance in the compressed state.
Figure 6:
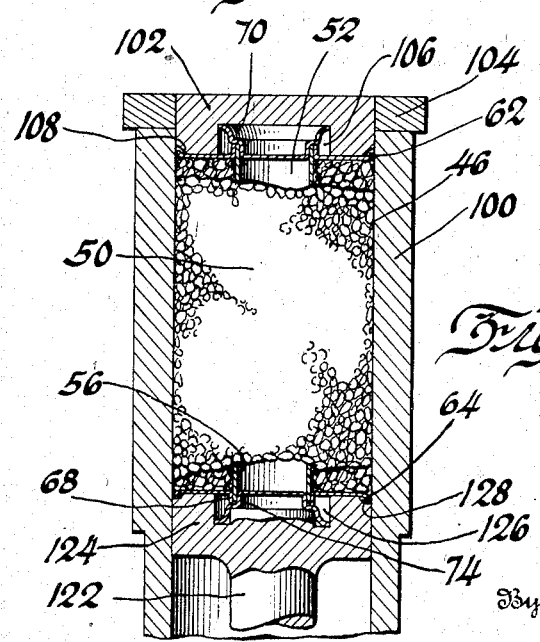
Figure 6 is a sectional view showing the manner of removing the filtering unit from the mold and applying the end disk.

In Figures 4, 5 and 6, the manner in which the filtering substance is compacted and the filtering unit formed is shown. The particular mechanism and method of forming and compacting the filter is no part of the present invention..

The matrix is indicated at 100 and has the removable bottom 102 and rests on the removable base 104. The removable bottom has a recess 106 therein to receive the flared part of the cup-shaped end element 70 of the filtering unit. The bottom 102 also has the annular edge recess 108 to receive the outturned flange 69 of the cup 70. In the mold there is assembled the cup 70, one of the end disks 62 or 64 and the cylinder or column 52. These three parts are welded together as previously described and rest in the mold being positioned by the recesses 106 and 108. In the top of the mold there is now inserted the core 110 which has a reduced end 112 which fits into the free end of the column 52. A definite weight of filtering material 50 is now placed in the mold and around the column 52 and the core 110. This filtering substance 50 consists of the nodulated mineral wool which is made by working ordinary mineral wool or blast furnace slag until it is in the form of balls or nodules. There is then added a definite quantity of a cold water paste such as potato or wheat starch in a solution and the two thoroughly mixed. After the required definite quantity has been placed in the mold, the plunger or compacting member 116 is placed in the top of the matrix 100. The plunger 116 is hollow as indicated at 118 to enable it to pass over the core 110 and the column 52. Either one of two processes or methods is now followed. The bottom of the mold or matrix may be agitated or jarred so that the inertia of the plunger 116 will cause it to descend to compact the filtering material 50. Optionally the plunger 116 may be suitably struck or impacted, or forced into the mold to cause it to compact the filtering material. The plunger is provided with a shoulder 120 to limit its downward movement. When the plunger has descended to the position shown in Figure 5, the filtering material 50 is compacted to about one-half its original size or in a ratio of about two to one. The plunger 116 and the core 110 are now withdrawn and the mold of the matrix 100 inverted as shown in Figure 6 and placed over a post 122 having an enlarged head 124 provided with the recesses 126 at its middle and a second recess 128 at its edge to receive the second end cup 62 or 64 and the flange 69 of the second end disk. By placing the mold 100 over the post and pressing downwardly, the free end 56 of the column or cylinder 52 will be forced between the adjacent flanges 68 and 78 on the disk 64 and cup 70, the friction between the parts 56, 68 and 74 being sufficient to hold them together and to retain the material on the cylinder 52 and between the end disks. By further pressing the mold 100 downward, the removable bottom 102 will be pushed out of the mold and finally the entire filtering unit 46 will be freed from the mold.

The latest applied end disk is not now spot-welded in place, but the unit is first dried (such as by passing it through an oven) in order to eliminate the excess moisture and to cause the compacted material to assume a hard and porous state. After the filtering unit leaves the oven, the end disk and cup are spot-welded in place.

In making the nodules a neutral mineral is used, that is, it is neither basic nor acid. Experiments which have been made with mineral wools have shown that the best results are obtained with a neutral mineral wool than with one which is either basic or acid. The reason seems to be that since the high degree of filtering efficiency with mineral wool is dependent on the ionization of the colloidal particles in the oil, the neutral fibers can more readily assume the opposite ionization in order to attract and trap the particles. It is therefore believed that oil rendered impure by foreign matter may be easier filtered by using a neutral mineral wool.

I claim:

1. In a filtering unit for use in an oil circulating system comprising a container, oil inlet and oil outlet openings, a perforated column mounted in said container, a fabric closely surrounding said column, and a dried hard molded mass of filtering material comprising nodules of mineral wool mixed with a binder, said filtering material surrounding said column.

2. A filter for use in an oil filtering system comprising a container having oil inlet and outlet openings, a perforated column mounted in said container, and a mass of filtering material comprising nodules of mineral wool mixed with a binder insoluble in oil and capable of maintaining the fibers of the nodules in associated relation.

3. A filtering unit for use in an oil filter having an inlet and an outlet, said unit comprising a perforated tubular column surrounded by a mass of nodules of mineral wool mixed with a binder insoluble in oil and capable of maintaining the fibers of the nodules in associated relation.

4. In the art of filtering the oil of the lubricating system of an internal combustion engine of an automobile having an oil filter in said system and said filter having an oil inlet and an oil outlet, a filtering material comprising a shaped and compacted but oil pervious nodulated mineral wool confined and retained in said filter so as to be surrounded by the oil to be filtered, a binder mixed with said nodulated mineral wool to bind the nodules together and to enable the filtering material to retain its shape, and means to mount the filtering material in the filter.

5. In the art of filtering the oil of the lubricating system of an internal combustion engine of an automobile having an oil filter in said system and said filter having an oil inlet and an oil outlet, a filtering material comprising a shaped and compacted but oil pervious nodulated mineral wool confined and retained in said filter so as to be surrounded by the oil to be filtered, a cold water paste binder mixed with said nodulated mineral wool to bind the nodules together and to enable the filtering material to retain its shape, and means to mount the filtering material in the filter.

6. In the art of filtering the oil of the lubricating system of an internal combustion engine of an automobile having an oil filter in said system and said filter having an oil inlet and an oil outlet, a filtering material comprising a compacted but oil pervious molded and dried nodulated mineral wool confined and retained in said filter so as to be surrounded by the oil to be filtered, a binder mixed with said nodulated mineral wool to bind the nodules together and to enable the wool to retain its shape, said nodulated mineral wool consisting of fine nodules only, and means to mount the filtering material in the filter.

7. In the art of filtering the oil of the lubricating system of an internal combustion engine having an oil filter in said system and said filter having an oil inlet and an oil outlet, an oil filtering material confined and retained in said filter so as to be surrounded by the oil therein, said material comprising a hard porous shaped mass of compacted but oil pervious nodules of mineral wool, a binder mixed with said nodules of mineral wool to hold the nodules together and maintain the shape of the mass, the nodules being substantially three-sixteenths of an inch to one-half an inch in diameter, and means to mount the filtering material in the filter.

8. In the art of filtering the oil of the lubricating system of an internal combustion engine having an oil filter in said system and said filter having an oil inlet and an oil outlet, an oil filtering material confined and retained in said filter so as to be surrounded by the oil therein, said material comprising a hard porous shaped mass of compacted but oil pervious nodules of mineral wool, a cold water paste binder mixed with said nodules of mineral wool to hold the nodules together and maintain the shape of the mass, the nodules being substantially three-sixteenths of an inch to one-half an inch in diameter, and means to mount the filtering material in the filter.

9. In a filtering unit for use in an oil circulating system comprising a container, oil inlet and oil outlet openings, a perforated column mounted in said container, a fabric closely surrounding said column, a dried hard molded compacted but oil pervious mass of filtering material comprising nodules of mineral wool, a binder mixed with said nodules of mineral wool to hold the nodules together and maintain the shape of the mass, said filtering material surrounding said column and fabric and said nodules of mineral wool being substantially three-sixteenths of an inch to one-half an inch in diameter.

HERBERT G. KAMRATH.